Oct. 4, 1938.  G. G. VERNON ET AL  2,131,910
HYDRAULIC TRANSMISSION
Filed Oct. 25, 1934  2 Sheets-Sheet 1

Oct. 4, 1938.　　　G. G. VERNON ET AL　　　2,131,910
HYDRAULIC TRANSMISSION
Filed Oct. 25, 1934　　　2 Sheets-Sheet 2

Patented Oct. 4, 1938

2,131,910

UNITED STATES PATENT OFFICE 2,131,910

HYDRAULIC TRANSMISSION

General G. Vernon and Andy J. Greenfield, Happy, Tex.

Application October 25, 1934, Serial No. 749,998

2 Claims. (Cl. 60—52)

Our invention concerns apparatus for converting rotary into reciprocating motion and in what we now consider a most satisfactory embodiment of our invention, it is embodied in pumping mechanism or apparatus, the rotary motion to be converted being for example, obtained from a windmill and transmitted to a pump plunger, or piston to reciprocate the latter for pumping water or other liquid. In that embodiment of our invention, the important or desirable objects are secured of constant and steady transmission of power to the reciprocating plunger or piston, freedom from or absence of loose joints that would result in lost motion or undue wear of parts, freedom from side thrust of parts, whereby loss of power and wear of parts are avoided, prevention or avoidance of wear from other causes and thereby giving long life to the working parts of the mechanism and dependability of operation at all times. Other objects and advantages of that embodiment of our invention will be seen from the hereinafter given description of the illustration in the drawings of that embodiment.

But it is to be understood as indeed has already been indicated, that our invention is not to be restricted in its scope only to the particular embodiment thereof shown in the drawings and hereinafter described, but our invention consists in whatever is described by or is included within the terms or scope of the appended claims.

In the accompanying drawings:

Fig. 1 is a view in side elevation with parts in section of the embodiment of our invention above referred to;

Figure 1:
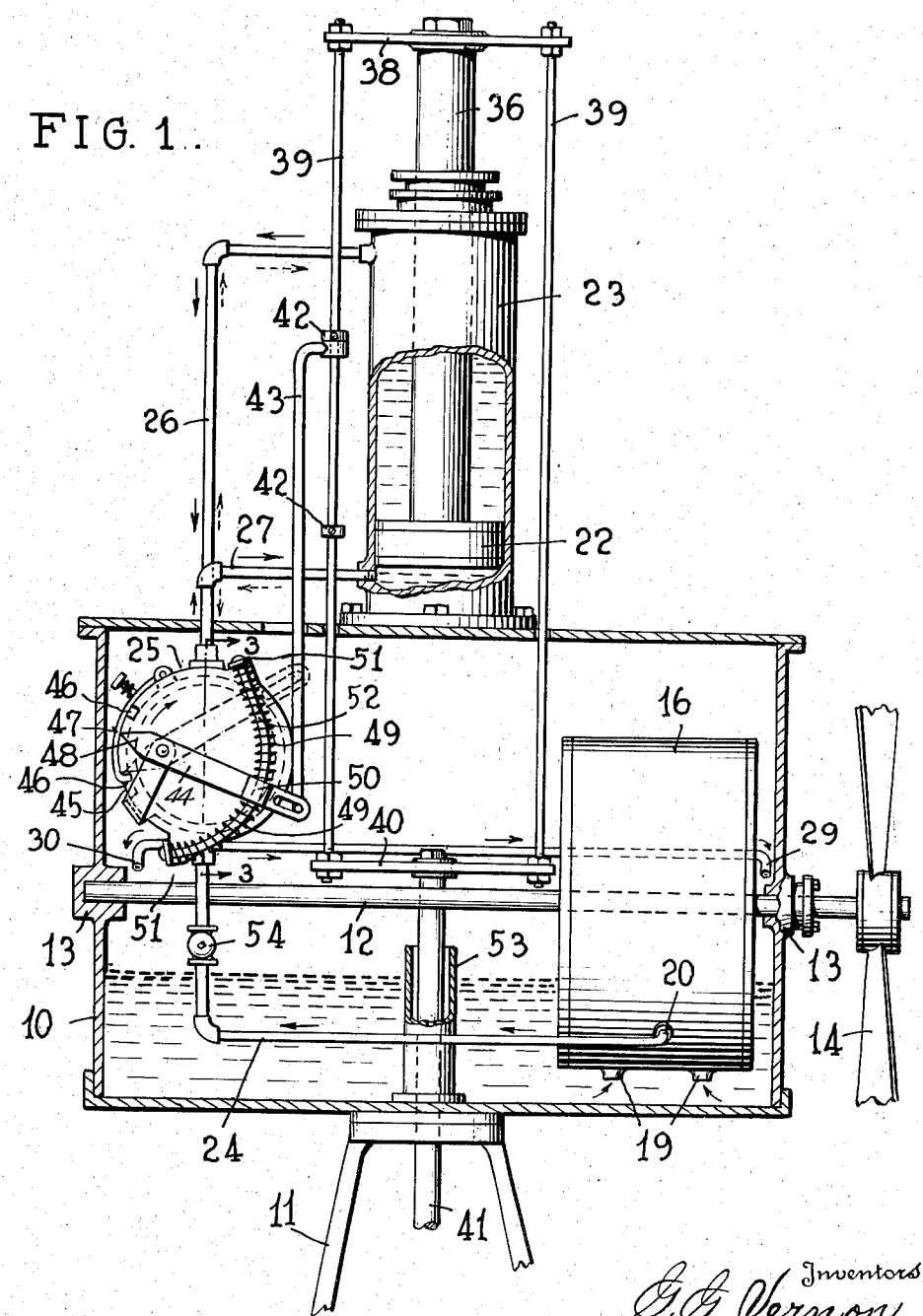
Figure 2:
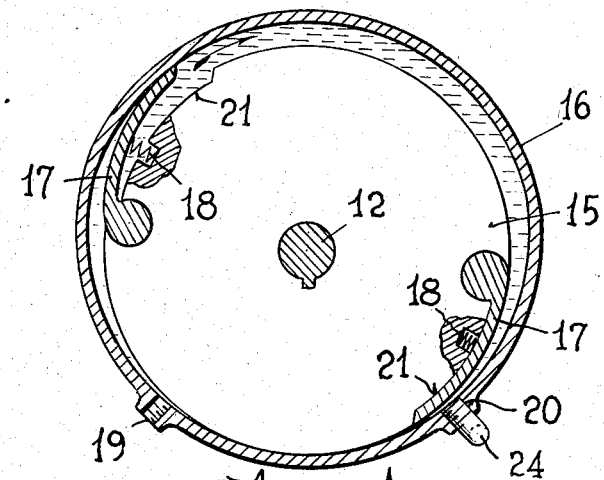
Fig. 2 is a cross-section through the rotary pump we prefer to employ in that embodiment of our invention.
Figure 3:
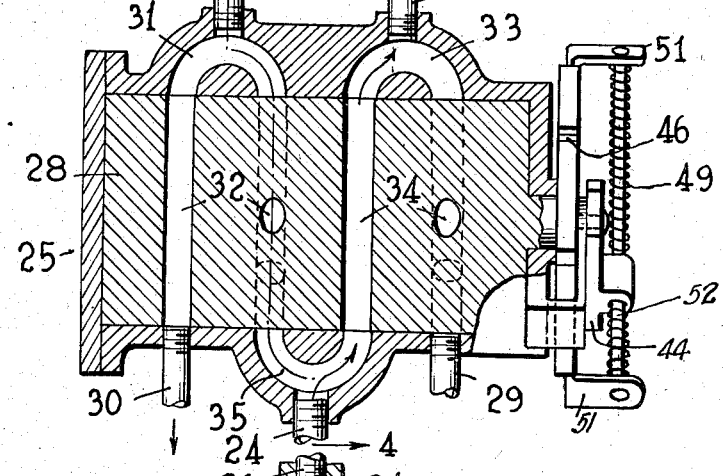
Fig. 3 is a longitudinal axial section on the line 3—3 of Fig. 1.
Figure 4:
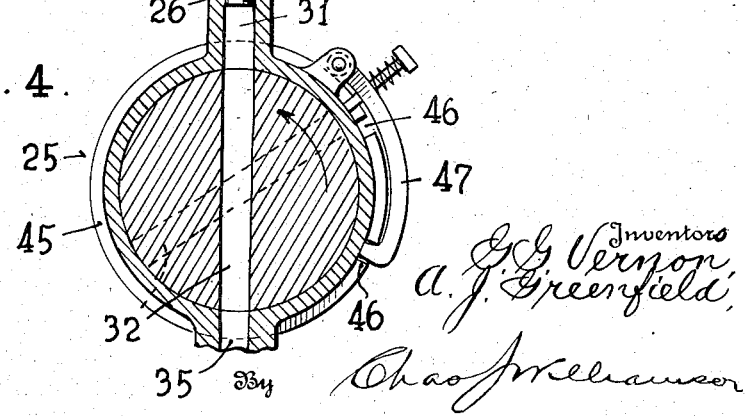
Fig. 4 is a cross-section on the line 4—4 of Fig. 3.

Briefly described, the embodiment of our invention shown in the drawings comprises a tank for holding liquid such as oil, a rotary pump situated in such tank whose rotor is revolved by the prime mover such as a windmill, a hydraulic cylinder and circulating connections between the rotary pump and the cylinder to opposite sides of the cylinder piston and including an automatically operated valve to change the direction of flow of transmission liquid between the pump and the hydraulic cylinder so as to cause reciprocation of the cylinder piston. The piston is connected to the piston rod of a pump and thus the energy from the prime mover is transmitted to that pump.

Describing in detail what appears in the drawings, there is a liquid holding tank 10, shown mounted on the upper end of a windmill frame work 11, through which tank passes a horizontal shaft 12, supported in suitable bearings 13 upon the opposite end walls of the tank. Upon one end of the shaft that projects to the outside of the tank is mounted the windwheel 14 by the revolution of which the shaft 12 is revolved and such windwheel is preferably of the high speed type and may be of any desired construction since in itself it is no part of the present invention.

Keyed to the shaft 12 is the rotor or impeller 15 of a rotary pump or motor having a cylindrical casing or shell 16, between the inner periphery of which and the rotor 15 is a substantially crescent-shaped space that is provided by the eccentric location of rotor axis and casing axis. Pivotally secured at one edge and at diametrically opposite points of the rotor body on the periphery thereof are two similar impeller blades or pistons 17, each of which is pressed yieldingly outward by a coil spring 18 in contact with the inner periphery of the shell or casing 16, at all points in the revolution of the rotor, so that the forward free edge of the blade or piston 17 will always contact with the inner periphery of the shell or casing, notwithstanding the eccentricity of the arrangement of rotor and casing. Thus each piston 17 will act in succession to draw into the casing or shell 16 through an induction port or ports 19, oil or other liquid within the tank 10 and will force or press forward through the curvilinear liquid space, liquid in advance of the forwardly moving surface of the piston and finally cause its expulsion from the shell through one or more exhaust ports 20. The induction and eduction or exhaust ports 19 and 20 are situated on opposite sides of the closest point of approach or contact of the rotor and the inner periphery of the shell or casing 16. For each curvilinear piston or blade 17, a recess 21 is provided in the adjacent periphery of the rotor body into which the piston moves or plays, as by the revolution of the rotor, the piston advances through the successively narrowing portions of the crescent space or chamber within the shell or casing 16. The contact of the free edge of a piston blade with the interior surface of the shell 16 makes it serve as a valve to prevent liquid in rear thereof passing beyond such plate and thus assures the suction action of the piston advancing beyond the induction port and assures the outflow of liquid through the exhaust port. The liquid space while tapering, as shown adjacent each port 19 and 20, is preferably the same width between such portions.

It will be seen that there is a constant or steady and continuous flow of liquid through the rotary pump so that liquid under the desired pressure flows through the eduction port or ports for delivery to the reciprocating plunger or piston 22, of the hydraulic cylinder 23, which as shown, is conveniently mounted on the top of the tank 10, and with which by suitable pipe and valve connections circulation of the power-transmitting fluid is accomplished.

The induction port or ports 19 open into the power transmission liquid which is maintained at a suitable level within the tank 10.

From exhaust port or ports 20, a pipe 24 runs to the induction port or ports of a control valve 25, which may be conveniently mounted or placed in the tank 10 and from suitable ports of said valve 25, a pipe 26, runs to the hydraulic cylinder 23, above the piston 22 thereof, and a second similar pipe 27, runs to the hydraulic cylinder below the piston 22, so that according to the position of the valve 25, liquid under pressure from the rotary pump will be delivered either to the underside of the piston 22 to force it upward, or to the upperside of such piston to force it downward.

The valve 25, shown is of the rotary type and within a casing with a cylindrical interior includes a close fitting oscillatory cylinder body 28, which has a set of diametrically extending ports spaced apart axially of the cylinder 28. Such ports are so relatively arranged with reference to the valve ports above mentioned that in one oscillatory position of the cylinder 28, there will be flow from the rotary pump through pipe 24 and pipe 26 to the hydraulic cylinder 23 above the piston 22 thereof, which at that time is at the upper end of the piston to supply liquid under pressure to the upper side of the piston and so as to connect pipe 27 at the bottom of the cylinder 23 with pipe 29, which leads from the valve 25 and opens into the tank 10 preferably adjacent one of the bearings 13 of the shaft 12 to lubricate the latter while at the same time returning liquid to the tank and thus complete circulation between tank and hydraulic cylinder 23. At another point in the oscillatory movement of the ported cylinder 28, the pipe connections will be reversed which occurs when the piston 22 is in its lowest position in cylinder 23, so that fluid under pressure will be delivered from pipe 27 to the under side of the piston 22 to move it upward, and liquid above the piston will be exhausted through pipe 26 and will be discharged from the valve by a pipe 30, that leads therefrom to a point near the other bearing of shaft 12, to lubricate the same and deliver the returning liquid to the tank 10. The arrows in full lines in Fig. 1 show the circulation when the piston is at the lower end of the hydraulic cylinder ready to ascend, and the arrows in dotted lines show the reverse direction of circulation when the piston has reached the upper limit of its travel and is ready to descend.

Pipe 26 has a branched connection 31 with two adjacent ports in the valve casing with which the two cylinder ports 32 alternately connect and the pipe 27 has a branched connection 33 with two adjacent ports in the valve casing with which alternately connect two ports 34 in the cylinder 28. And pipe 24 leading from the rotary pump has a branched connection 35 which opens into the cylinder casing in position to aline with the ports 32 and 34 that are nearer one another.

The rotary valve cylinder 28 is automatically shifted at the proper time to reverse the flow of liquid to and from hydraulic cylinder 23 by an operative connection with the piston 22. As shown in the drawings, such operative connection includes a piston rod 36 which passes upward through a packing box 37 at the upper end of the cylinder 23 and above the top of the cylinder 23 is connected to a frame or yoke that includes a top cross bar 38, a pair of parallel vertical rods 39 that extend downward on the outside of the cylinder 23, and a bottom cross bar 40, which connects said rods a substantial distance below the bottom of the cylinder 23, and to which is connected the piston rod 41 of the well pump that is driven by the windmill.

Upon one of the rods 39, two set collars 42 are placed at spaced distances apart and in position so that one or the other according as the rod moves up or down, will engage and carry along with it as it moves a rod 43, which at its upper end has an eye through which the rod 39 passes, and at its lower end is pivotally connected to an arm or lever 44, pivoted between its ends to an oscillatory disc 45, at one end of the valve 25, and which is rigidly connected to the oscillatory ported cylinder 28 of the valve. In the peripheral edge of the disc 45, are two spaced apart radial notches 46, which alternately are engageable by one end of a spring-held latch 47, and thereby the ported cylinder 28 is releasably held in each of its two positions. The notch-engaging end of the latch is in position to be engaged by one or the other inclined sides of the beveled point or extremity 48 of the lever 44, and disengaged from the notch it happens to engage to free the disc 45, and the ported cylinder 28 for movement which is automatically effected by a spring device. Said spring device includes two oppositely acting coil springs 49 situated on opposite sides of the lever 44 and having at their nearer ends bearing contact on a lug 50, projecting outward from said lever, and each spring at its other or outer end engages a bearing 51, secured to the edge of the oscillatory disc 45, so that as the lever 44 moves in one direction, it compresses one of said springs until the tip 48 of the lever disengages the latch 47, whereupon the spring 49 thus compressed will be suddenly released and reacting will turn the disc 45 and the valve cylinder 28 to a point where the latch 47 engages with the other notch 46. The springs are curved to readily allow the swinging movement of the lever 48 and to support and guide them, they are placed upon a correspondingly curved rod 52, that extends from one bearing 51 to the other.

Surrounding the portion of the pump rod 42 within the tank 10, is a tube 53, whose top reaches to a point above the level of the oil or other liquid in the tank 10, and thus a packing is rendered unnecessary where the pump rod passes through the bottom of the tank.

In the eduction pipe 24 leading from the pump is a safety valve 54, located in advance of the control valve 25, so that should there be any obstruction to the movement of the moving parts, such as the pump rod 53 because of freezing of water in the pump rod shaft, such safety valve will open during the continued action of the pump and no breakage or other damage to parts of the mechanism will result. The safety valve delivers liquid therefrom back into the tank 10.

It is a feature of our apparatus that the down-stroke of the piston 22 and the pump rod, is faster than the upstroke. For example, the speed may be twice as great during the down-stroke. This we accomplish by reducing the volume of the space within the hydraulic cylinder 23, which is above the piston 22, over that below and that we do by giving the piston rod 36 a diameter great enough for that purpose, so that in fact, it is to be regarded as a filling cylinder rather than a mere piston rod.

We have already stated that the scope of our invention is not restricted to the embodiment thereof shown in the drawings. As an indication of some other embodiments, we point out that instead of the frame or yoke that connects the piston 22, with the pump rod, there may be a single rod extending downward from the piston 22, with which the connections for operating the control valve may be made; and another type of control valve than the rotary type may be employed in some embodiments of our invention; and other variations or departures in the particular construction of the mechanism may be made.

What we claim is:

1. A valve mechanism including a casing provided with a plurality of ports therein, an oscillatory ported valve body movable to at least two positions to interconnect different of said ports in the valve casing, latch means adapted to lock said ported valve body at either of said two positions, and means for actuating said ported valve body and releasing said latch means comprising a pivoted lever connected to said ported valve body by springs which are alternately compressed by movements of said pivoted lever in different directions and which act to move the ported valve body to the other of said positions after said pivoted lever releases said latch means.

2. A reversing valve for use with a hydraulic mechanism having a piston therein, including a casing, an oscillatory valve body in said casing, movable latch means connected to the casing formed for selective engagement with the valve body to retain the latter in predetermined positions, spring means carried by the valve body, a combined latch releasing and valve operating lever connected to the valve casing and engageable with the spring means to compress the latter in opposite directions, and means connecting the lever and piston whereby upon movement of the latter the spring means is first compressed and the latch and spring then released to oscillate the valve body in either of said opposite directions.

GENERAL G. VERNON.
ANDY J. GREENFIELD.